US012394359B2

(12) United States Patent
Chae

(10) Patent No.: US 12,394,359 B2
(45) Date of Patent: Aug. 19, 2025

(54) GATE DRIVER AND TOUCH SENSING DISPLAY DEVICE INCLUDING THE SAME

(71) Applicant: LG Display Co., Ltd., Seoul (KR)

(72) Inventor: Gyu Cheol Chae, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/883,559

(22) Filed: Sep. 12, 2024

(65) Prior Publication Data

US 2025/0246118 A1 Jul. 31, 2025

(30) Foreign Application Priority Data

Jan. 29, 2024 (KR) ........................ 10-2024-0013179

(51) Int. Cl.
*G09G 3/20* (2006.01)

(52) U.S. Cl.
CPC ... *G09G 3/2096* (2013.01); *G09G 2310/0267* (2013.01); *G09G 2310/08* (2013.01); *G09G 2354/00* (2013.01)

(58) Field of Classification Search
None
See application file for complete search history.

(56) References Cited

U.S. PATENT DOCUMENTS

2017/0052635 A1* 2/2017 Yu ......................... G06F 3/0446
2017/0221411 A1* 8/2017 Chang .................. G11C 19/287
2023/0214037 A1* 7/2023 Hwang ............... G06F 3/04184
345/174

FOREIGN PATENT DOCUMENTS

KR 10-2022-0040859 A 3/2022
KR 10-2391616 B1 4/2022

OTHER PUBLICATIONS

Intellectual Property Office of the United Kingdom, Combined Search and Examination Report, United Kingdom Patent Application No. GB 2414574.0, Mar. 20, 2025, five pages.

* cited by examiner

*Primary Examiner* — Krishna P Neupane
(74) *Attorney, Agent, or Firm* — Fenwick & West LLP

(57) ABSTRACT

A gate driving circuit includes a plurality of first odd main stages configured to drive first odd gate lines of a first display block in a first display period, a plurality of second odd main stages configured to drive second odd gate lines of a second display block adjacent to the first display block in a second display period, an odd reset dummy stage configured to reset a Q node included in a first lower-priority operation stage that is relatively late in operation order among the plurality of first odd main stages in the first display period; and an odd set dummy stage configured to set a Q node included in a first higher-priority operation stage that is relatively advanced in operation order among the plurality of second odd main stages in the second display period.

21 Claims, 12 Drawing Sheets

GATE DRIVER AND TOUCH SENSING DISPLAY DEVICE INCLUDING THE SAME

CROSS-REFERENCE TO RELATED APPLICATION

This application claims the benefit of the Republic of Korea Patent Application No. 10-2024-0013179 filed on Jan. 29, 2024, which is hereby incorporated by reference in its entirety.

BACKGROUND

Field of Technology

The present disclosure relates to a gate driving circuit and a touch sensing display device including the same.

Discussion of the Related Art

Touch sensing display device may recognize a touch input of a user applied to a display panel and may perform various application functions based thereon.

Touch sensing display device time-divisionally allocate a display period for display driving and a touch period for touch sensing driving and alternately perform display driving and touch sensing driving.

In this case, the touch period is arranged between adjacent display periods. The gate driving circuit performs an output operation of a scan signal in only the display period and stops the output operation of the scan signal in the touch period. Therefore, Q node holding stress is applied to some stages of the gate driving circuit during the touch period. In some stages, when a Q node is not discharged due to the touch period and maintains a long-time charging state, Q node holding stress applied to a pull-up element increases. Such an adverse operation is more deepened in a case where the pull-up element is implemented as an oxide transistor.

SUMMARY

To overcome the aforementioned problem of the related art, the present disclosure may provide a gate driving circuit and a touch sensing display device including the same, which may minimize or at least reduce Q node holding stress applied to at least some stages when performing time division driving of a display period and a touch period.

In one embodiment, a gate driving circuit comprises: a plurality of first odd main stages configured to drive first odd gate lines of a first display block during a first display period, the plurality of first odd main stages including a first plurality of first odd main stages and a second plurality of first odd main stages; a plurality of second odd main stages configured to drive second odd gate lines of a second display block that is arranged after the first display block in a second display period that is after the first display period, the plurality of second odd main stages including a first plurality of second odd main stages and a second plurality of second odd main stages; an odd reset dummy stage configured to reset a Q node included in each of the second plurality of first odd main stages that operate after the first plurality of first odd main stages to a reset level during the first display period; and an odd set dummy stage configured to set a Q node included in each of the first plurality of second odd main stages that operates before the second plurality of second odd main stages to a set level during the second display period, wherein all of Q nodes of the plurality of first odd main stages and all of the Q nodes of the plurality of second odd main stages maintain the reset level during a touch period that is arranged between the first display period and the second display period.

In one embodiment, a touch sensing display device comprises: a display panel divided into a first display block and a second display block that is arranged after the first display block in the display panel, the first display block including first odd subpixels that are connected to first odd gate lines included in the display panel and first even subpixels that are connected to first even gate lines included in the display panel, and the second display block including second odd subpixels that are connected to second odd gate lines included in the display panel and second even subpixels that are connected to second even gate lines included in the display panel; and a gate driving circuit configured to drive the first odd gate lines and the first even gate lines of the first display block and the second odd gate lines and the second even gate lines of the second display block, wherein the gate driving circuit comprises: a plurality of first odd main stages configured to drive the first odd gate lines of the first display block during a first display period, the plurality of first odd main stages including a first plurality of first odd main stages and a second plurality of first odd main stages; a plurality of second odd main stages configured to drive the second odd gate lines of the second display block during a second display period, the plurality of second odd main stages including a first plurality of second odd main stages and a second plurality of second odd main stages; an odd reset dummy stage configured to reset a Q node included in each of the second plurality of first odd main stages that operate after the first plurality of first odd main stages to a reset level during the first display period; and an odd set dummy stage configured to set a Q node included in each of the first plurality of second odd main stages that operates before the second plurality of second odd main stages to a set level during the second display period, wherein all of Q nodes of the plurality of first odd main stages and all of the Q nodes of the plurality of second odd main stages maintain the reset level during a touch period during which touch of the display panel is sensed, the touch period arranged between the first display period and the second display period.

In one embodiment, a touch display device comprises: a display panel divided into a plurality of display blocks including a first display block, the first display block including first subpixels that are connected to first gate lines included in the display panel and second subpixels that are connected to second gate lines included in the display panel; and a gate driving circuit configured to drive the first gate lines and the second gate lines of the first display block, the gate driving circuit comprising: a plurality of first main stages configured to drive the first gate lines but not the second gate lines during a first display period during which an image is displayed on the display panel, the plurality of first main stages including a first plurality of first main stages and a second plurality of first main stages; and a first reset dummy stage configured to reset a Q node included in each of the second plurality of first main stages that operate after the first plurality of first main stages to a reset level during the first display period without resetting a Q node included in each of the first plurality of first main stages during the first display period, wherein all of Q nodes of the first plurality of first main stages and all of the Q nodes of the second plurality of first main stages included in the plurality of first main stages have the reset level during a touch period during which touch of the display panel is sensed, the touch period after the first display period.

To achieve these objects and other advantages and in accordance with the purpose of the disclosure, as embodied and broadly described herein, a gate driving circuit includes a plurality of first odd main stages configured to drive first odd gate lines of a first display block in a first display period, a plurality of second odd main stages configured to drive second odd gate lines of a second display block adjacent to the first display block in a second display period, an odd reset dummy stage configured to reset a Q node included in a first lower-priority operation stage that is relatively late in operation order among the plurality of first odd main stages in the first display period; and an odd set dummy stage configured to set a Q node included in a first higher-priority operation stage that is relatively advanced in operation order among the plurality of second odd main stages in the second display period, wherein all of Q nodes of the plurality of first odd main stages and Q nodes of the plurality of second odd main stages maintain a reset level during a touch period arranged between the first display period and the second display period.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
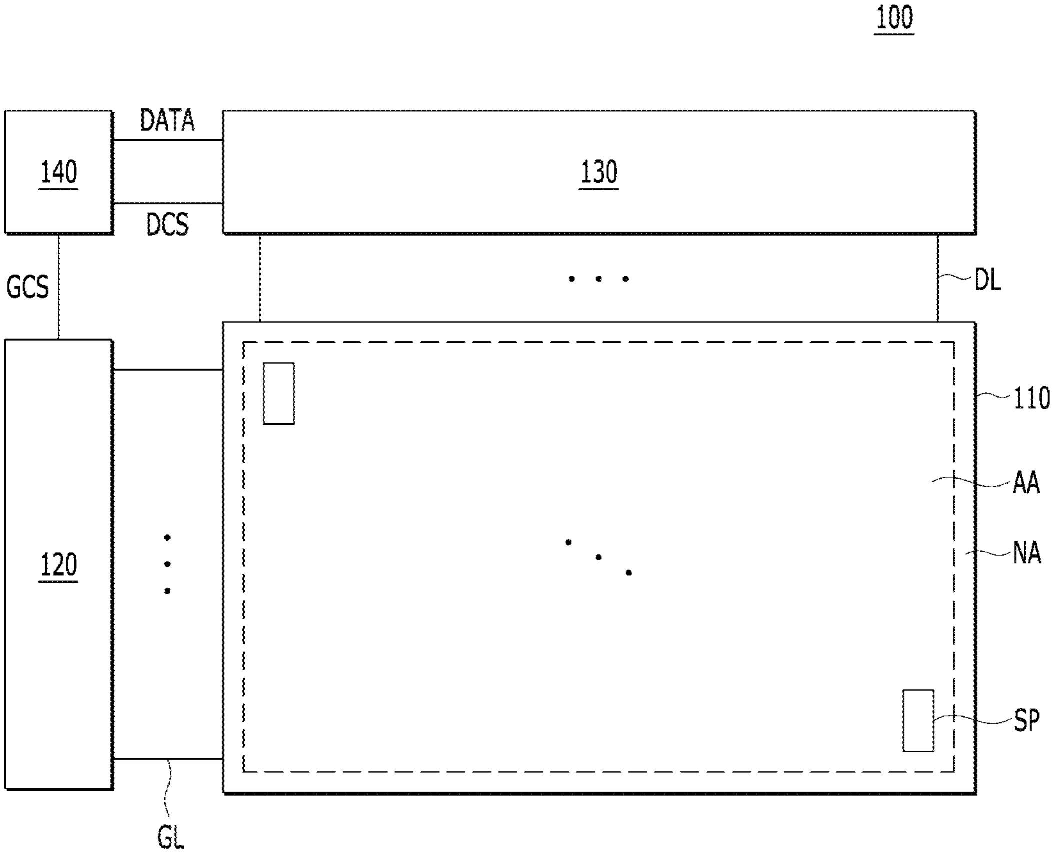
FIGS. 1 and 2 are diagrams schematically illustrating a touch sensing display device according to the present embodiment.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 2:
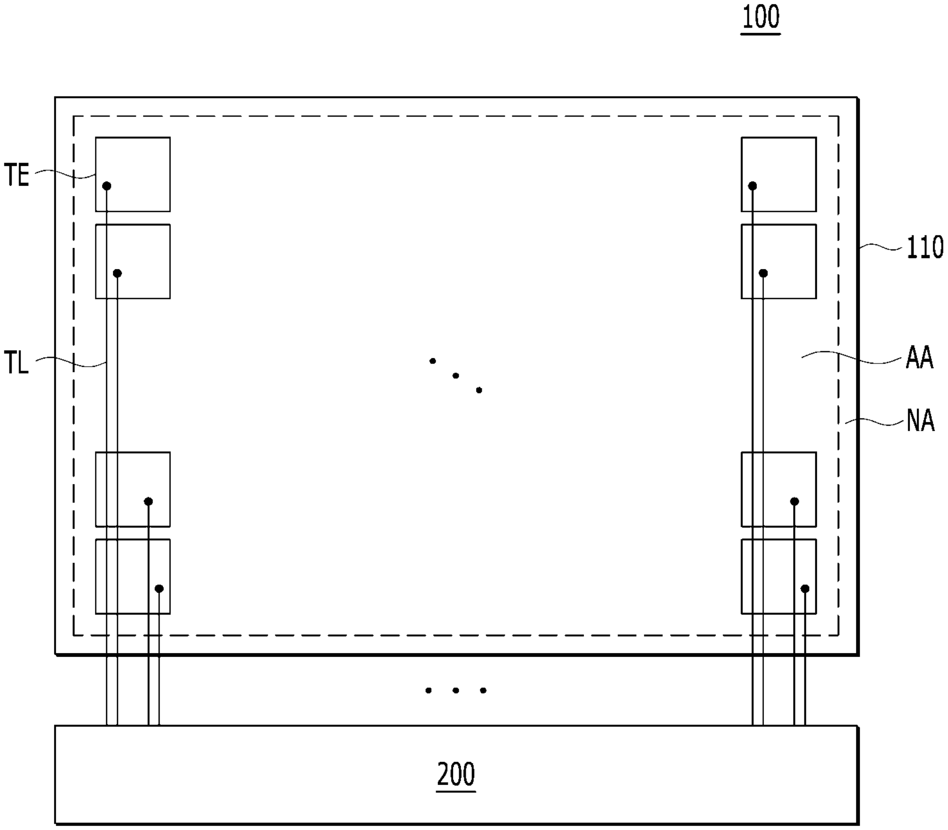

FIGS. 1 and 2 are diagrams schematically illustrating a touch sensing display device 100 according to the present embodiment.

Referring to FIGS. 1 and 2, the touch sensing display device 100 according to the present embodiment may provide a display function of reproducing an input image in a screen thereof and a touch sensing function of sensing a touch input of a user.

The touch sensing display device 100 may include a display panel 110 where a plurality of data lines DL and a plurality of gate lines GL are provided, a display driving circuit for driving the display panel 110, and a timing controller 140.

In terms of functions, the display driving circuit may be divided into a gate driving circuit 120 for driving the gate lines GL and a data driving circuit 130 for driving the data lines DL. The display driving circuit may be implemented as one or more integrated circuits (ICs).

The display panel 110 may include an active region AA where a plurality of subpixels SP are provided and a non-active region NA which is disposed outside the active region AA. Each of a plurality of touch electrodes TE may be disposed in a region corresponding to a plurality of subpixels SP. A touch electrode TE may be referred to as a touch node.

The plurality of data lines DL and the plurality of gate lines GL may be disposed in the display panel 110, and subpixels SP may be provided in areas defined by intersections between the data lines DL and the gate lines GL. A plurality of touch lines TL electrically connected to the plurality of touch electrodes TE may be disposed in the display panel 110.

First, elements for display driving in the touch sensing display device 100 will be described below.

The gate driving circuit 120 may be controlled by the timing controller 140 and may sequentially output a scan signal to the plurality of gate lines GL disposed in the display panel 110 to control a driving timing of each of the plurality of subpixels SP.

The gate driving circuit 120 may include one or more gate driver integrated circuits (GDICs), and the GDICs may be disposed at only one side of the display panel 110 or both sides of the display panel 110, based on a driving type.

Each of the GDICs may be connected to a bonding pad of the display panel 110 in a tape automated bonding (TAB) type or a chip on glass (COG) type. Alternatively, each GDIC may be implemented as a gate in panel (GIP) type and may be directly disposed in the display panel 110. Alternatively, each GDIC may be integrated and disposed in the display panel 110. Alternatively, each GDIC may be implemented as a chip on film (COF) type mounted on a film connected to the display panel 110.

The data driving circuit 130 may receive image data from the timing controller 140 and may convert the image data into analog data voltages. The data driving circuit 130 may output the data voltages to the data lines DL in synchronization with a timing at which the scan signal is applied through the gate lines GL and may thus allow the subpixels SP to implement brightness based on the image data.

The data driving circuit 130 may include one or more source driver integrated circuits (SDICs). Each of the SDICs may include a shift register, a latch circuit, a digital-to-analog converter (DAC), and an output buffer.

Each SDIC may be connected to a bonding pad of the display panel 110 in the TAB type or the COG type. Alternatively, each SDIC may be directly disposed in the display panel 110. Alternatively, each SDIC may be integrated and disposed in the display panel 110. Alternatively, each SDIC may be implemented as the COF type. In this case, each SDIC may be mounted on a film connected to the display panel 110 and may be electrically connected to the display panel 110 through lines of the film.

The timing controller 140 may supply various control signals to the gate driving circuit 120 and the data driving circuit 130 and may control operation timings of the gate driving circuit 120 and the data driving circuit 130.

The timing controller 140 may be mounted on a printed circuit board (PCB) or a flexible PCB and may be electrically connected to the gate driving circuit 120 and the data driving circuit 130 through the PCB or the FPCB.

The timing controller 140 may allow the gate driving circuit 120 to output the scan signal, based on a timing set in each frame, and may allow the data driving circuit 130 to convert image data into data voltages and output the data voltages in synchronization with the scan signal.

The timing controller 140 may receive, from the outside (for example, a host system), various timing signals including a vertical synchronization signal VSYNC, a horizontal synchronization signal HSYNC, an input data enable signal DE, and a clock signal CLK along with the image data.

The timing controller 140 may generate a gate control signal GCS and a data control signal DCS by using the various timing signals received from the outside, may output the gate control signal GCS to the gate driving circuit 120, and may output the data control signal DCS to the data driving circuit 130.

The gate control signal GCS may include a gate start pulse GSP, a gate shift clock GSC, and a gate output enable signal GOE. The gate start pulse GSP may control an operation start timing of each of one or more GDICs configuring the gate driving circuit 120. The gate shift clock GSC may be a clock signal which is input to one or more GDICs in common and may control a shift timing of the scan signal. The gate output enable signal GOE may control an output timing of each of one or more GDICs.

The data control signal DCS may include a source start pulse SSP, a source sampling clock SSC, and a source output enable signal SOE. The source start pulse SSP may control a data sampling start timing of each of one or more SDICs configuring the data driving circuit 130. The source sampling clock SSC may be a clock signal which controls a sampling timing of data in each SDIC. The source output enable signal SOE may control an output timing of the data driving circuit 130.

The touch sensing display device 100 may further include a power management IC which supplies various voltages or currents to the display panel 110, the gate driving circuit 120, and the data driving circuit 130, or controls various voltages or currents which are to be supplied.

Hereinafter, elements for touch sensing driving in the touch sensing display device 100 will be described below.

The touch sensing display device 100 may include a touch screen panel where a plurality of touch electrodes TE are disposed for touch sensing and a touch circuit 200 which drives and senses the touch screen panel.

The touch screen panel may be an external type where the touch screen panel is manufactured independently from the display panel 110 and is bonded to the display panel 110, or may be an internal type where the touch screen panel is manufactured together in a manufacturing process of the display panel 110 and is provided in the display panel 110. In the touch sensing display device 100 according to the present embodiment, the touch screen panel may be an independent panel including the touch sensing function, or may denote the display panel 110 which has all of the touch sensing function and the display function. Hereinafter, the internal type where the touch screen panel is in the display panel 110 will be described for example.

The touch circuit 200 may drive and sense the plurality of touch electrodes TE disposed in the display panel 100. The touch circuit 200 may supply a touch driving signal to the touch electrodes TE, may receive and accumulate a touch sensing signal from the touch electrodes TE, and may detect touch coordinates and whether there is a touch, based on a touch sensing accumulation signal. The touch circuit 200 may be implemented as one element or two or more elements (for example, ICs) and may be implemented independently from the display driving circuit. Also, all or a portion of the touch circuit 200 may be integrated and implemented in the display driving circuit or an internal circuit thereof. For example, a portion of the touch circuit 200 may be implemented as an IC along with the data driving circuit 130.

The touch electrode TE may be an electrode which is disposed by dividing a common electrode for display driving. In this case, the touch electrode TE may perform a function of an electrode for touch sensing and a function of an electrode for display sensing.

The touch circuit 200 may supply the touch driving signal to the touch electrode TE in a touch period temporally differentiated from a display driving period to perform touch sensing.

Figure 3:
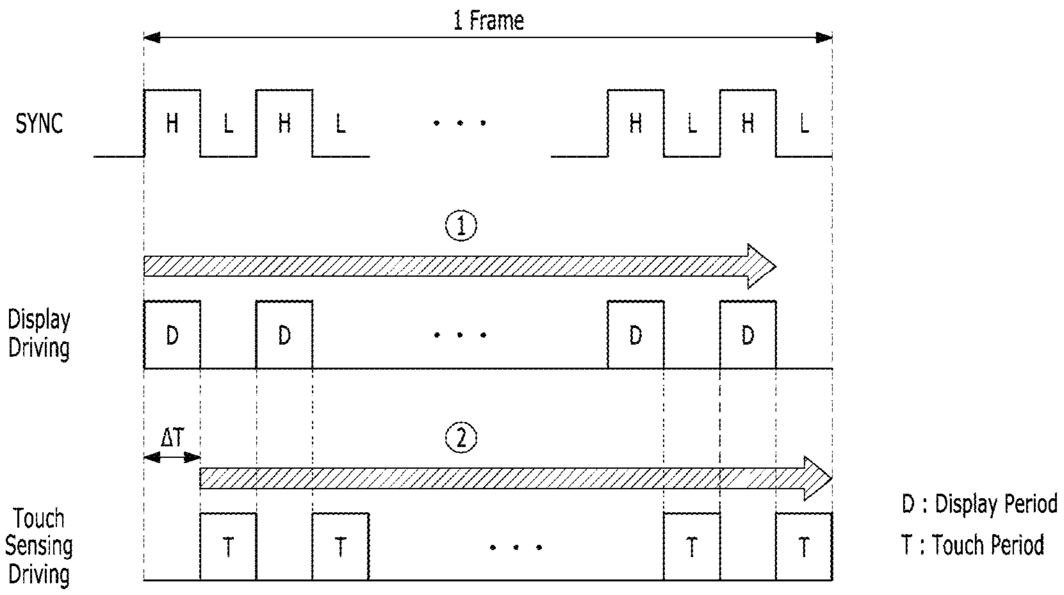
FIG. 3 is a diagram illustrating an example where one frame is time-divisionally driven in a display period and a touch period according to the present embodiment.

FIG. 3 is a diagram illustrating an example where one frame according to the present embodiment is time-divisionally driven in a display period and a touch period.

Referring to FIG. 3, in the touch sensing display device according to the present embodiment, one frame period may include a plurality of display periods D and a plurality of touch periods T. The display periods D may correspond to a high period H of a touch synchronization signal SYNC, and the touch periods T may correspond to a low period L of the touch synchronization signal SYNC. In response to the touch synchronization signal SYNC where the high period H and the low period L are alternated, the display period D and the touch period T may be alternately arranged in one frame.

Display driving ① may be performed in the display periods D, and touch sensing driving ② may be performed in the touch periods T. In one frame, a start timing of the touch sensing driving ② may be ΔT later than a start timing of the display driving ①.

Some of a plurality of horizontal blank periods may be used as touch periods T. A display scan operation and a write operation of image data based thereon may not be performed and may stop in the horizontal blank periods. In the horizontal blank periods, the data enable signal may not swing to a high level and a low level and may maintain a low level.

The touch sensing display device according to the present embodiment may sense a touch input based on a finger of a user or a stylus pen in the touch periods T. As described above, the touch sensing display device according to the present embodiment may sense a touch input of the user through the touch periods T temporally differentiated from the display periods D in one frame period, and thus, may perform touch sensing driving in the middle of displaying an image.

Figure 4:
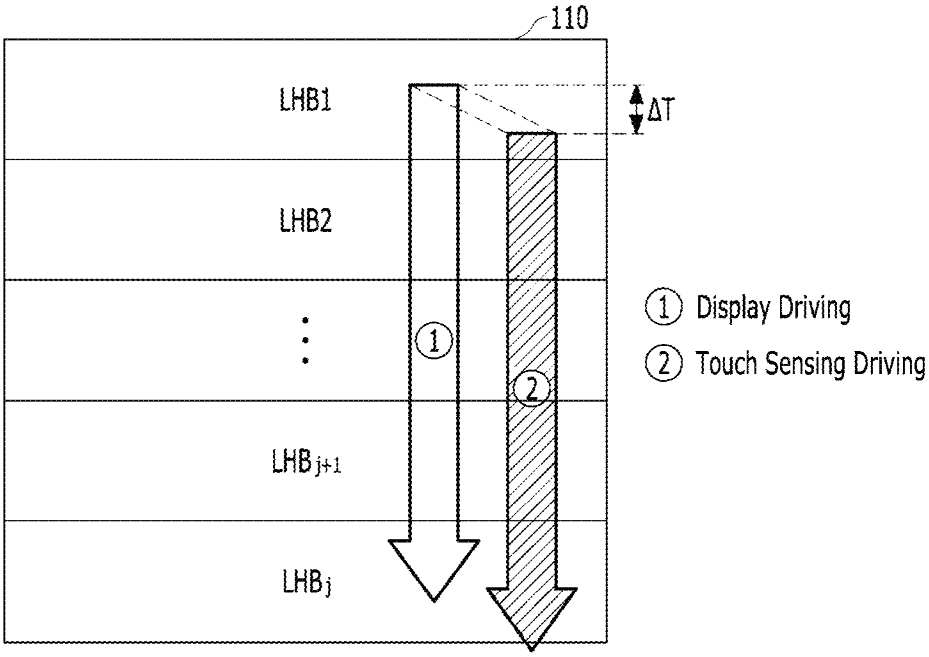
FIG. 4 is a diagram illustrating an example where a display panel is divisionally driven as a plurality of display blocks according to the present embodiment.
Figure 5:
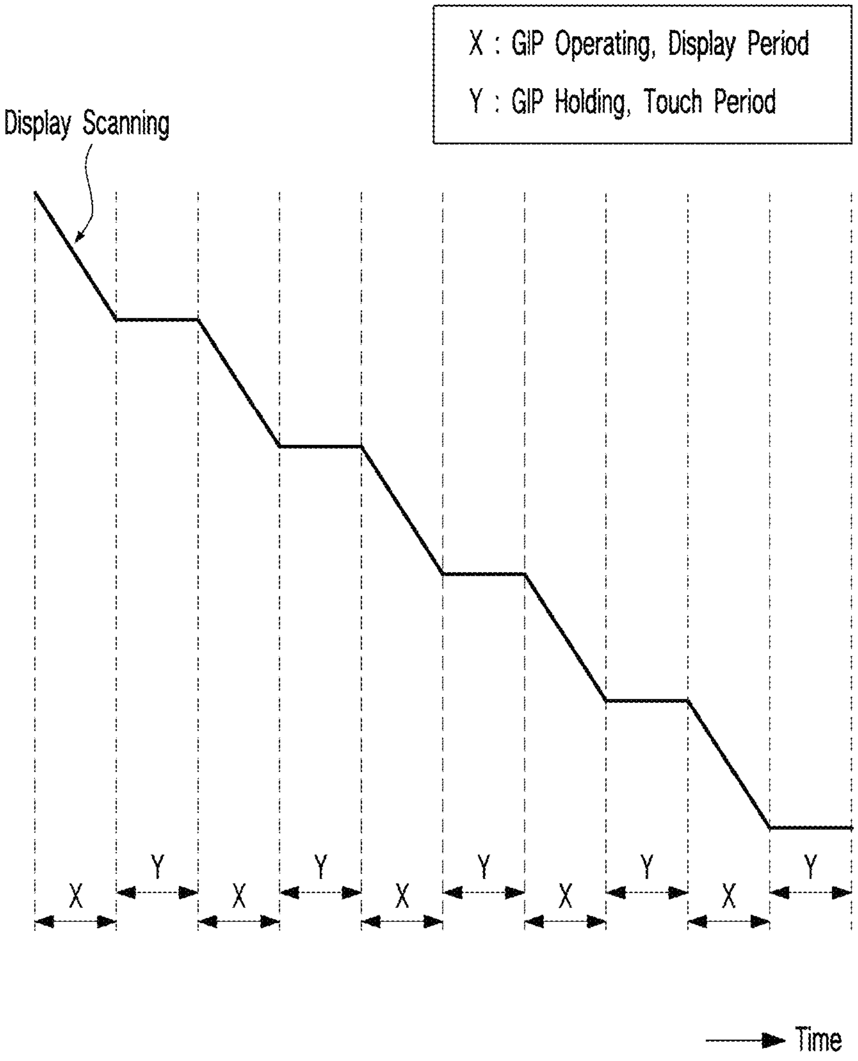
FIG. 5 is a diagram illustrating an example where display scan is performed on display blocks in display periods, and the display scan on the display blocks stops in touch periods according to the present embodiment.

FIG. 4 is a diagram illustrating an example where a display panel according to the present embodiment is divisionally driven as a plurality of display blocks. FIG. 5 is a diagram illustrating an example where display scan is performed on display blocks in display periods, and the display scan on the display blocks stops in touch periods.

Referring to FIG. 4, a display panel 110 according to the present embodiment may be divisionally driven as a plurality of display blocks LHB1 to LBHj. With respect to the plurality of display blocks LHB1 to LBHj, display driving ① may be performed, and then, touch sensing driving ② may be performed. With respect to the plurality of display blocks LHB1 to LBHj, the display driving ① and the touch sensing driving ② may be alternated with a time difference equal to ΔT.

The touch sensing driving ② may be performed on LHB1 while the display driving ① is being performed on LHB2, the touch sensing driving ② may be performed on LHB2 while the display driving ① is being performed on LHB3, and the touch sensing driving ② may be performed on LHBj-1 while the display driving ① is being performed on LHBj.

A display scan operation (GIP Operation) may be performed in display periods X as in FIG. 5 and may not be performed in touch periods Y. That is, the display scan operation may stop in the touch periods Y (GIP Holding).

The display scan operation may be performed by the gate driving circuit 120 of FIG. 1. The gate driving circuit 120 may output a scan signal to gate lines in the display periods X. Also, the gate driving circuit 120 may stop an output of the scan signal to the gate lines in the touch periods Y. Thus, the gate driving circuit 120 does not output the scan signal to the gate lines during the touch periods Y.

Because the output of the scan signal to the gate lines in the touch periods Y stops, Q node holding stress may be applied to some stages of the gate driving circuit 120 during the touch period Y.

An embodiment of the present disclosure described below may provide a method for minimizing or at least reducing Q node holding stress applied to at least some stages of the gate driving circuit 120 when performing time division driving of the display period X and the touch period Y.

Figure 6:
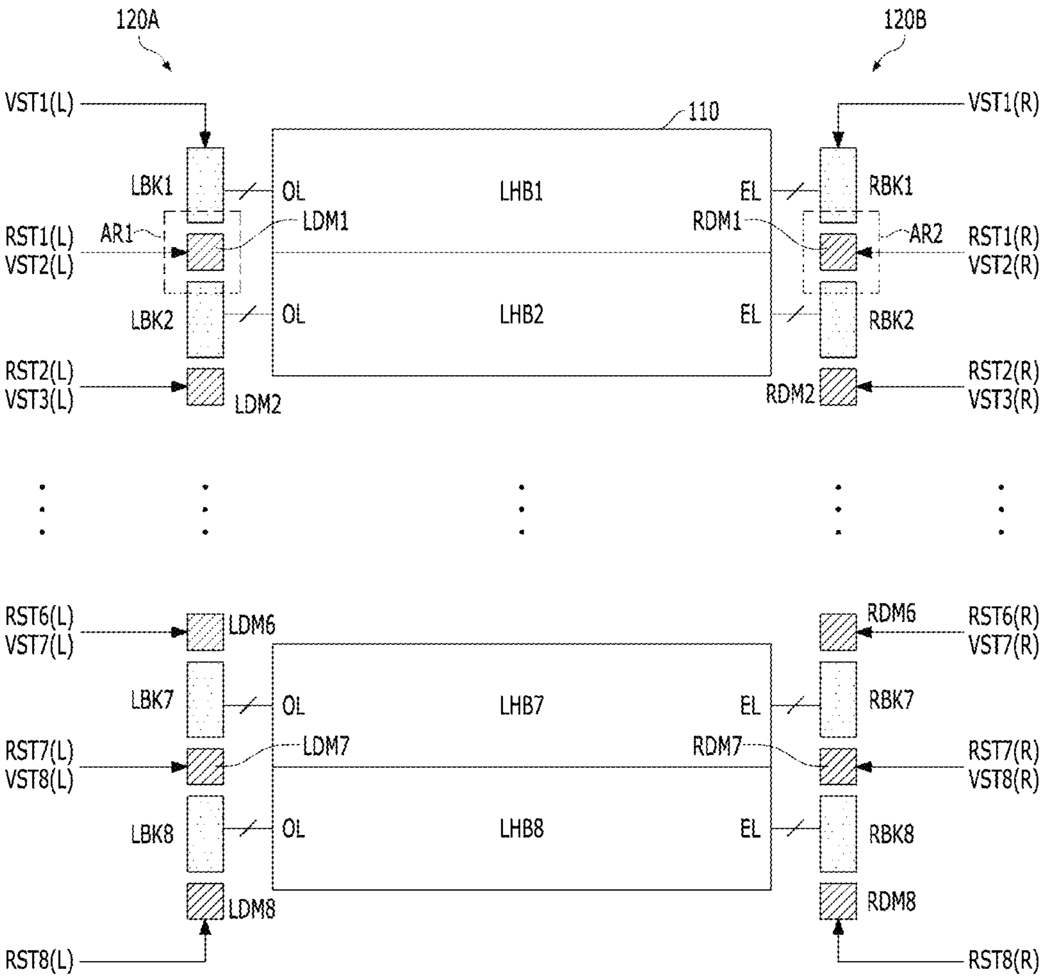
FIG. 6 is a diagram illustrating a configuration of a gate driving circuit for divisionally driving a plurality of display blocks according to the present embodiment.

FIG. 6 is a diagram illustrating a configuration of a gate driving circuit for divisionally driving a plurality of display blocks LHB1 to LHB8 according to the present embodiment.

Referring to FIG. 6, a gate driving circuit 120 according to the present embodiment may include a first gate driver 120A disposed at a left side (e.g., a first side) of display blocks LHB1 to LHB8 and a second gate driver 120B disposed at a right side (e.g., a second side) of the display blocks LHB1 to LHB8.

The first gate driver 120A and the second gate driver 120B may interlace-drive the display blocks LHB1 to LHB8.

With respect to eight display blocks LHB1 to LHB8, eight display periods and eight touch periods may be allocated. In this case, a display period and a touch period may be alternated one-by-one.

The first gate driver 120A may include eight odd main blocks LBK1 to LBK8 and eight odd dummy blocks LDM1 to LDM8, so as to drive odd gate lines OL included in eight display blocks LHB1 to LHB8.

The eight odd main blocks LBK1 to LBK8 and the eight odd dummy blocks LDM1 to LDM8 may be disposed in a left GIP region of the display blocks LHB1 to LHB8. In the left GIP region, one of the eight odd main blocks LBK1 to LBK8 and one of the eight odd dummy blocks LDM1 to LDM8 may be alternately arranged. Thus, at least one odd dummy block LDM is between a pair of odd main blocks LBK in the first gate driver 120A.

Operation stages equal to the number of odd gate lines OL included in the eight display blocks LHB1 to LHB8 may be included in the eight odd main blocks LBK1 to LBK8.

One or more odd reset dummy stages and one or more odd set dummy stages may be included in each of the eight odd dummy blocks LDM1 to LDM8.

The odd reset dummy stages included in the eight odd dummy blocks LDM1 to LDM8 may allow all Q nodes of the eight odd main blocks LBK1 to LBK8 to maintain a reset level during touch periods. Thus, the odd reset dummy stages reset or change a voltage of the Q node to the reset level during the touch periods.

To this end, an output of the odd reset dummy stage of the odd dummy block LDM1 may reset a Q node included in a lower-priority operation stage included in the odd main block LBK1, an output of the odd reset dummy stage of the odd dummy block LDM2 may reset a Q node included in a lower-priority operation stage included in the odd main block LBK2, and an output of the odd reset dummy stage of the odd dummy block LDM3 may reset a Q node included in a lower-priority operation stage included in the odd main block LBK3. Likewise, an output of the odd reset dummy stage of the odd dummy block LDM8 may reset a Q node included in a lower-priority operation stage included in the odd main block LBK8. In one embodiment, the "priority" refers to the arrangement of the operation stage. For example, a "lower-priority" operation stage within the odd main block LBK refers to an arrangement of the lower-priority operation stage after other operation stages within the odd main block LBK. As a result of the arrangement, the lower-priority operation stages operate (e.g., output their respective scan signals) after the operation of the higher-priority operation stages.

Q nodes of the odd reset dummy stages may be reset by one of external odd reset signals RST1(L) to RST8(L).

Moreover, an output of the odd set dummy stage of the odd dummy block LDM1 may set a Q node included in a higher-priority operation stage included in the odd main block LBK2 to a predetermined voltage, an output of the odd set dummy stage of the odd dummy block LDM2 may set a Q node included in a higher-priority operation stage included in the odd main block LBK3 to a predetermined voltage, and an output of the odd set dummy stage of the odd dummy block LDM3 may set a Q node included in a higher-priority operation stage included in the odd main block LBK4 to a predetermined voltage. Likewise, an output of the odd set dummy stage of the odd dummy block LDM7 may set a Q node included in a higher-priority operation stage included in the odd main block LBK8 to a predetermined voltage. In one embodiment, a "higher-priority" operation stage refers to an arrangement of the operation stage before lower-priority operation stages within the odd main block LBK, for example. As a result of the arrangement, the higher-priority operation stages operate (e.g., output their respective scan signals) before the operation of the lower-priority operation stages.

Q nodes of the odd set dummy stages may be set by one of external odd set signals VST1(L)~VST8(L).

Moreover, the second gate driver 120B may include eight even main blocks RBK1 to RBK8 and eight even dummy blocks RDM1 to RDM8, so as to drive even gate lines EL included in the eight display blocks LHB1 to LHB8.

The eight even main blocks RBK1 to RBK8 and the eight even dummy blocks RDM1 to RDM8 may be disposed in a right GIP region of the display blocks LHB1 to LHB8. In the right GIP region, one of the eight even main blocks RBK1 to RBK8 and one of the eight even dummy blocks RDM1 to RDM8 may be alternately arranged. Thus, at least one even dummy block RDM is between a pair of even main blocks RBK in the second gate driver 120B.

Operation stages equal to the number of even gate lines EL included in the eight display blocks LHB1 to LHB8 may be included in the eight even main blocks RBK1 to RBK8.

One or more even reset dummy stages and one or more even set dummy stages may be included in each of the eight even dummy blocks RDM1 to RDM8.

The even reset dummy stages included in the eight even dummy blocks RDM1 to RDM8 may allow all Q nodes of the eight even main blocks RBK1 to RBK8 to maintain the reset level in the touch periods. Thus, the even reset dummy stages reset or change a voltage of the Q node to the reset level during the touch periods.

To this end, an output of the even reset dummy stage of the even dummy block RDM1 may reset a Q node included in a lower-priority operation stage included in the even main block RBK1, an output of the even reset dummy stage of the even dummy block RDM2 may reset a Q node included in a lower-priority operation stage included in the even main block RBK2, and an output of the even reset dummy stage of the even dummy block RDM3 may reset a Q node included in a lower-priority operation stage included in the even main block RBK3. Likewise, an output of the even reset dummy stage of the even dummy block RDM8 may reset a Q node included in a lower-priority operation stage included in the even main block RBK8. As mentioned above, the "priority" refers to the arrangement of the operation stage. For example, a "lower-priority" operation stage refers to an arrangement of the lower-priority operation stage amount the operation stages included in the even main block RBK.

Q nodes of the even reset dummy stages may be reset by one of external even reset signals RST1(R) to RST8(R).

Moreover, an output of the even set dummy stage of the even dummy block RDM1 may set a Q node included in a higher-priority operation stage included in the even main block RBK2 to a predetermined voltage, an output of the even set dummy stage of the even dummy block RDM2 may set a Q node included in a higher-priority operation stage included in the even main block RBK3 to a predetermined voltage, and an output of the even set dummy stage of the even dummy block RDM3 may set a Q node included in a higher-priority operation stage included in the even main block RBK4 to a predetermined voltage. Likewise, an output of the even set dummy stage of the even dummy block RDM7 may set a Q node included in a higher-priority operation stage included in the even main block RBK8 to a predetermined voltage. In one embodiment, a "higher-priority" operation stage refers to an arrangement of the higher-priority operation stage before other operation stages in the even dummy block RDK.

Q nodes of the even set dummy stages may be set by one of external even set signals VST1(R)~VST8(R).

Figure 7:
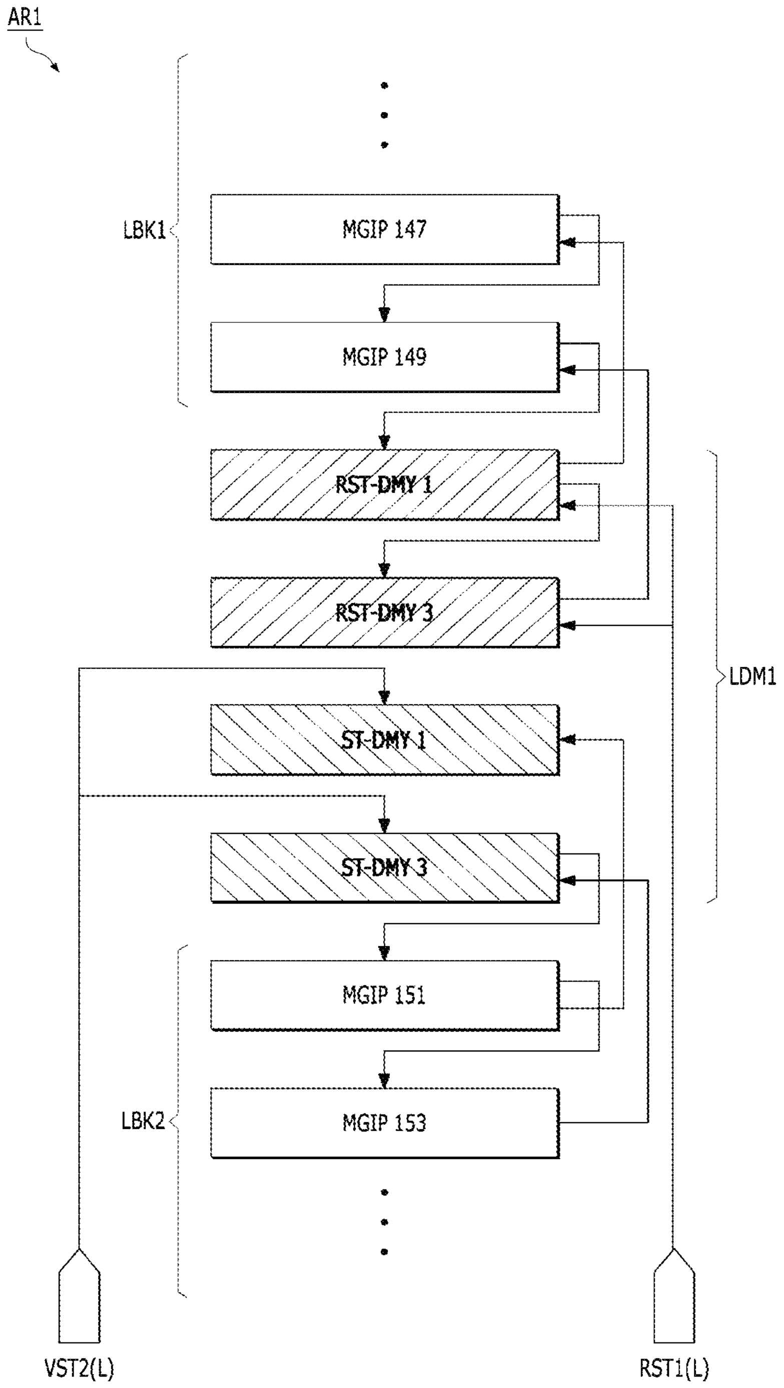
FIG. 7 is a diagram illustrating in detail a configuration of a first gate driver corresponding to a region AR1 of FIG. 6 according to the present embodiment.
Figure 8:
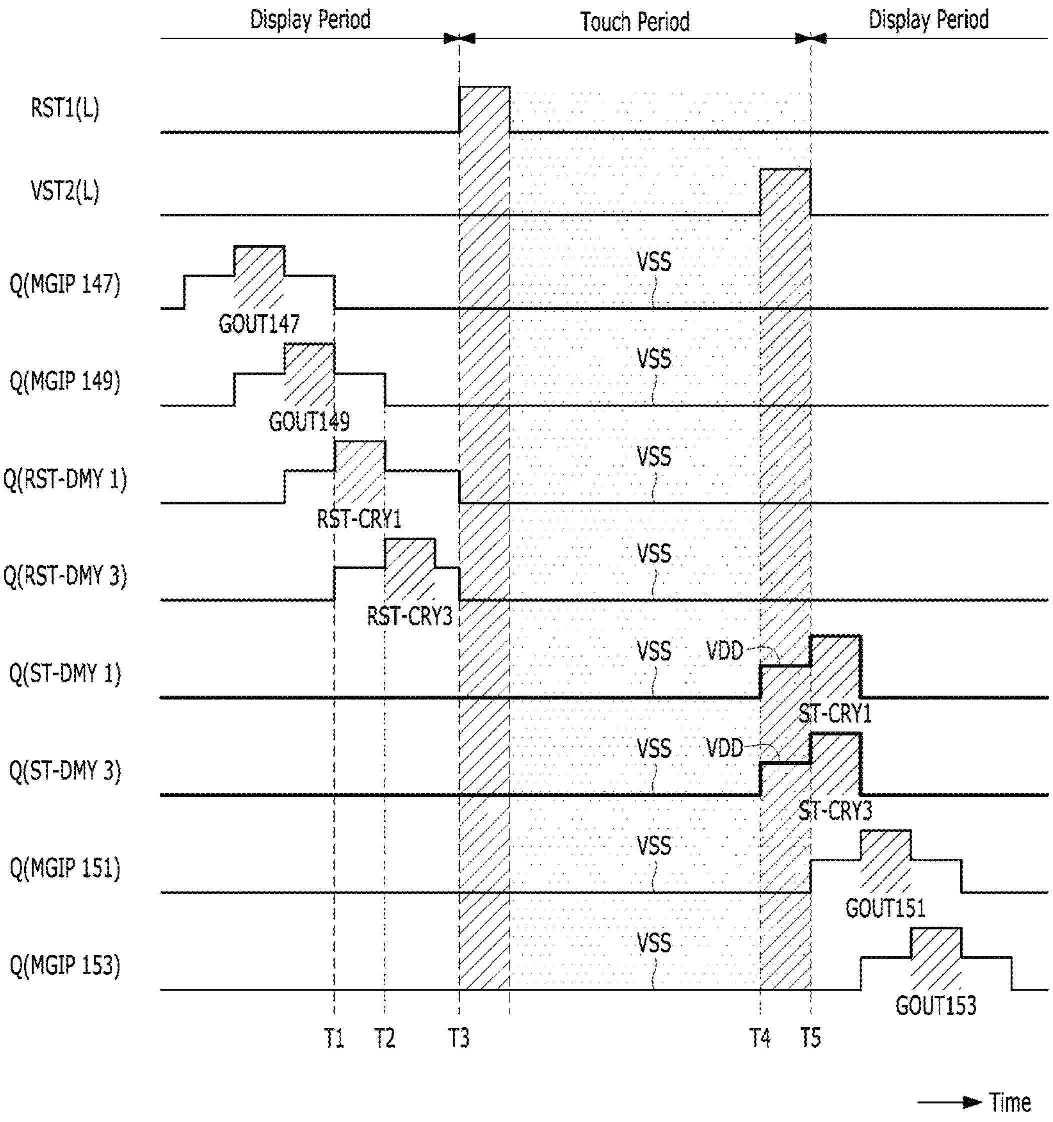
FIG. 8 is a diagram illustrating an operation timing of the first gate driver corresponding to the region AR1 of FIG. 6 according to the present embodiment.

FIG. 7 is a diagram illustrating in detail a configuration of a first gate driver 120A corresponding to a region AR1 of FIG. 6 according to one embodiment. FIG. 8 is a diagram illustrating an operation timing of the first gate driver 120A corresponding to the region AR1 of FIG. 6 according to one embodiment.

Referring to FIGS. 6, 7, and 8, the first gate driver 120A according to the present embodiment may include a plurality of first odd main stages LBK1 which drive first odd gate lines OL of a first display block LHB1 in a first display period, a plurality of second odd main stages LBK2 which drive second odd gate lines OL of a second display block LHB2 adjacent to the first display block LHB1 in a second display period, odd reset dummy stages RST-DMY1 and RST-DMY3 for resetting Q nodes included in lower-priority operation stages MGIP147 and MGIP149 of the first odd main stages LBK1 in the first display period without resetting the Q nodes included in the higher-priority operation stages, and odd set dummy stages ST-DMY1 and ST-DMY3 for setting Q nodes included in higher-priority operation stages MGIP151 of the second odd main stages LBK2 in the second display period without setting the Q nodes included in the lower-priority operation stages.

In one embodiment, each main stage includes a first plurality of main stages and a second plurality of main stages. The second plurality of main stages operate (e.g., output their respective scan signals) after operation of the first plurality of main stages. In one embodiment, the second plurality of main stages are arranged after the first plurality of main stages. For example, in FIG. 7, operation stages MGIP 147 and MGIP 149 are the last operation stages within the first odd main stages LBK1 and are considered lower-priority operation stages whereas operation stages within the first odd main stages LBK1 that are arranged before operation stages MGIP 147 and MGIP 149 are considered higher-priority operation stages as those operation stages operate before operation stages MGIP 147 and MGIP 149.

All of the odd reset dummy stages RST-DMY1 and RST-DMY3 and the odd set dummy stages ST-DMY1 and ST-DMY3 may not be connected to the first odd gate lines OL of the first display block LHB1 and to the second odd gate lines OL of the second display block LHB2.

A voltage of a Q node included in a lower-priority operation stage MGIP147 of the first odd main stages LBK1 may be reset to a low-level voltage VSS at a first timing T1 of the first display period, based on an output RST-CRY1 of the odd reset dummy stage RST-DMY1.

A voltage of a Q node included in a lower-priority operation stage MGIP149 of the first odd main stages LBK1 may be reset to the low-level voltage VSS at a second timing T2 of the first display period, based on an output RST-CRY3 of the odd reset dummy stage RST-DMY3.

Therefore, during a touch period, all of Q nodes of the first odd main stages LBK1 and Q nodes of the second odd main stages LBK2 may maintain the reset level of the low-level voltage VSS, and thus, Q node holding stress causing the problem of the related art may be minimized.

Figure 11:
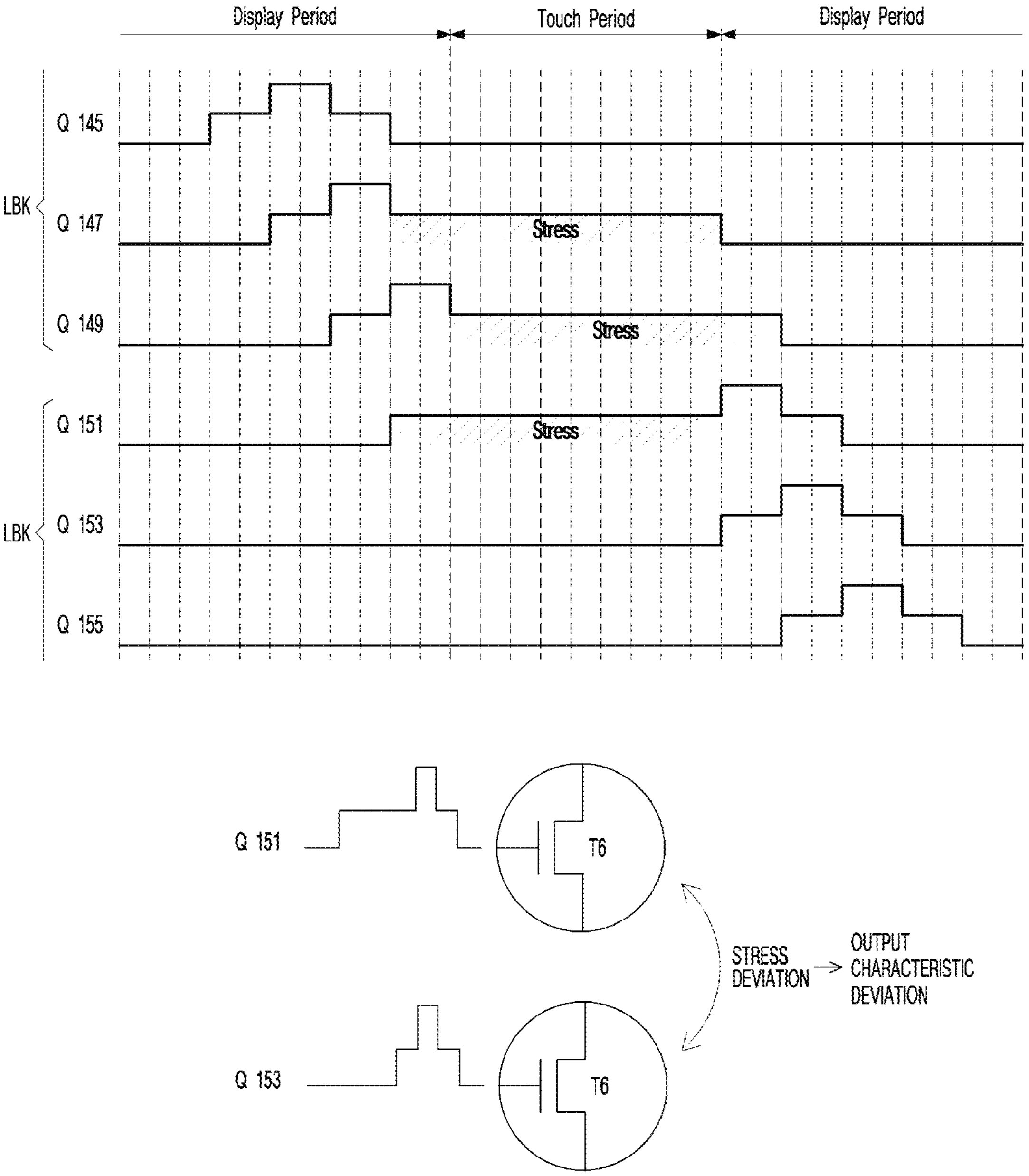
FIG. 11 is a diagram illustrating Q node holding stress causing a problem in the related art.

The Q node holding stress causing the problem of the related art is illustrated in FIG. 11. Referring to FIG. 11, in Q nodes Q147, Q149, and Q151 of some stages of a gate driving circuit, because a Q node is not reset and maintains a set state during the touch period, an output characteristic may be changed due to a degradation deviation between pull-up elements connected to the Q nodes.

According to the present embodiment, in the first display period succeeding the touch period, all of the Q nodes of the first odd main stages LBK1 and the Q nodes of the second odd main stages LBK2 may be reset, and thus, the problem of the related art may be solved.

A voltage of the Q node included in each of the odd reset dummy stages RST-DMY1 and RST-DMY3 may be reset to the low-level voltage VSS at a third timing T3 of the first display period, based on an external odd reset signal RST1 (L). At this time, the external odd reset signal RST1(L) may be synchronized with a start timing of a touch period.

A voltage of the Q node included in each of the odd set dummy stages ST-DMY1 and ST-DMY3 may be reset to a high-level voltage VDD at a fourth timing T4 of the touch period, based on an external odd set signal VST2(L). At this time, the external odd set signal VST2(L) may be synchronized with an end timing of the touch period.

A voltage of a Q node included in a higher-priority operation stage MGIP151 of the second odd main stages LBK2 may be set to the high-level voltage VDD at a fifth timing T5 of the second display period, based on outputs ST-CRY1 and ST-CRY3 of the odd set dummy stages ST-DMY1 and ST-DMY2.

In FIG. 8, GOUT 147 represents an output of the operation stage MGIP147, GOUT 149 represents an output of the operation stage MGIP149, GOUT 151 represents an output of the operation stage MGIP151, and GOUT 153 represents an output of the operation stage MGIP153.

Figure 9:
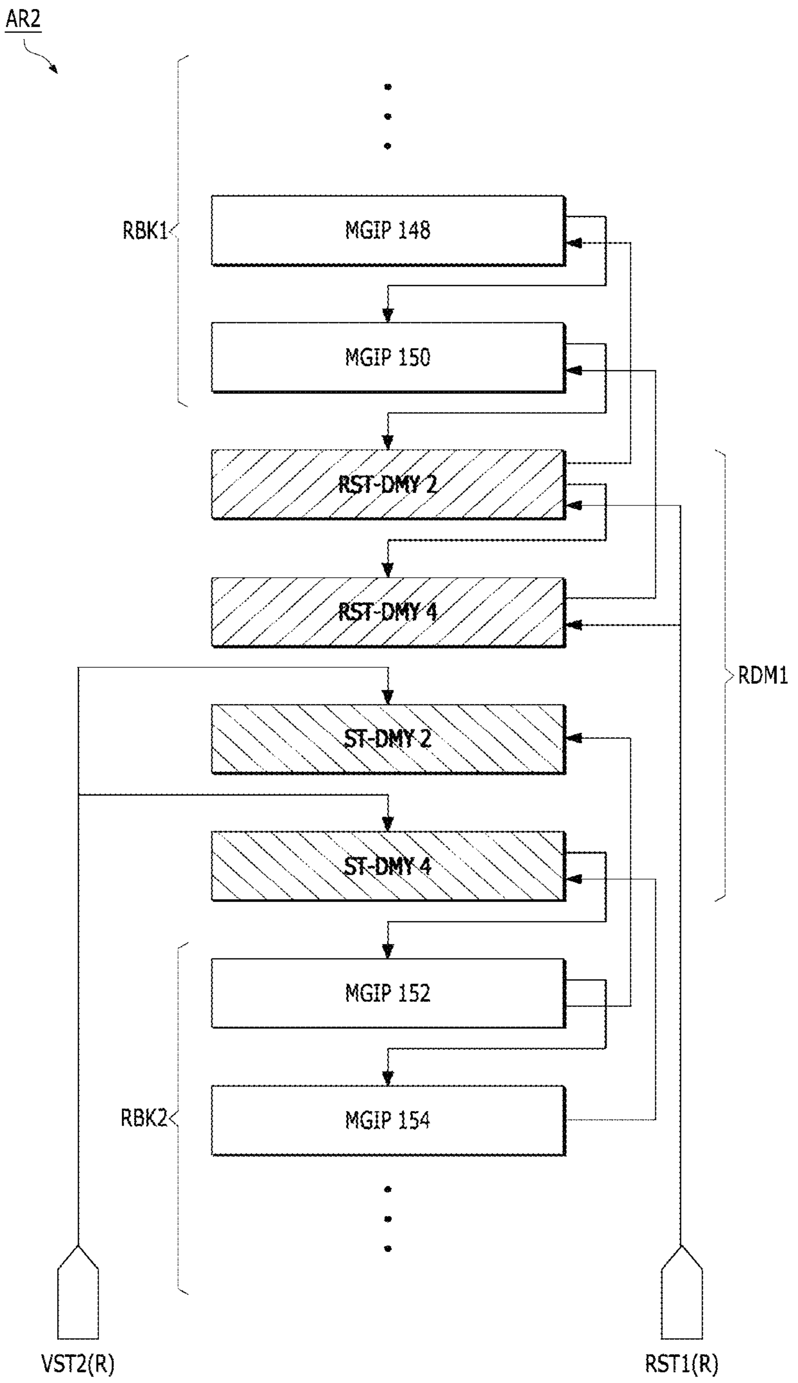
FIG. 9 is a diagram illustrating in detail a configuration of a second gate driver corresponding to a region AR2 of FIG. 6 according to the present embodiment.
Figure 10:
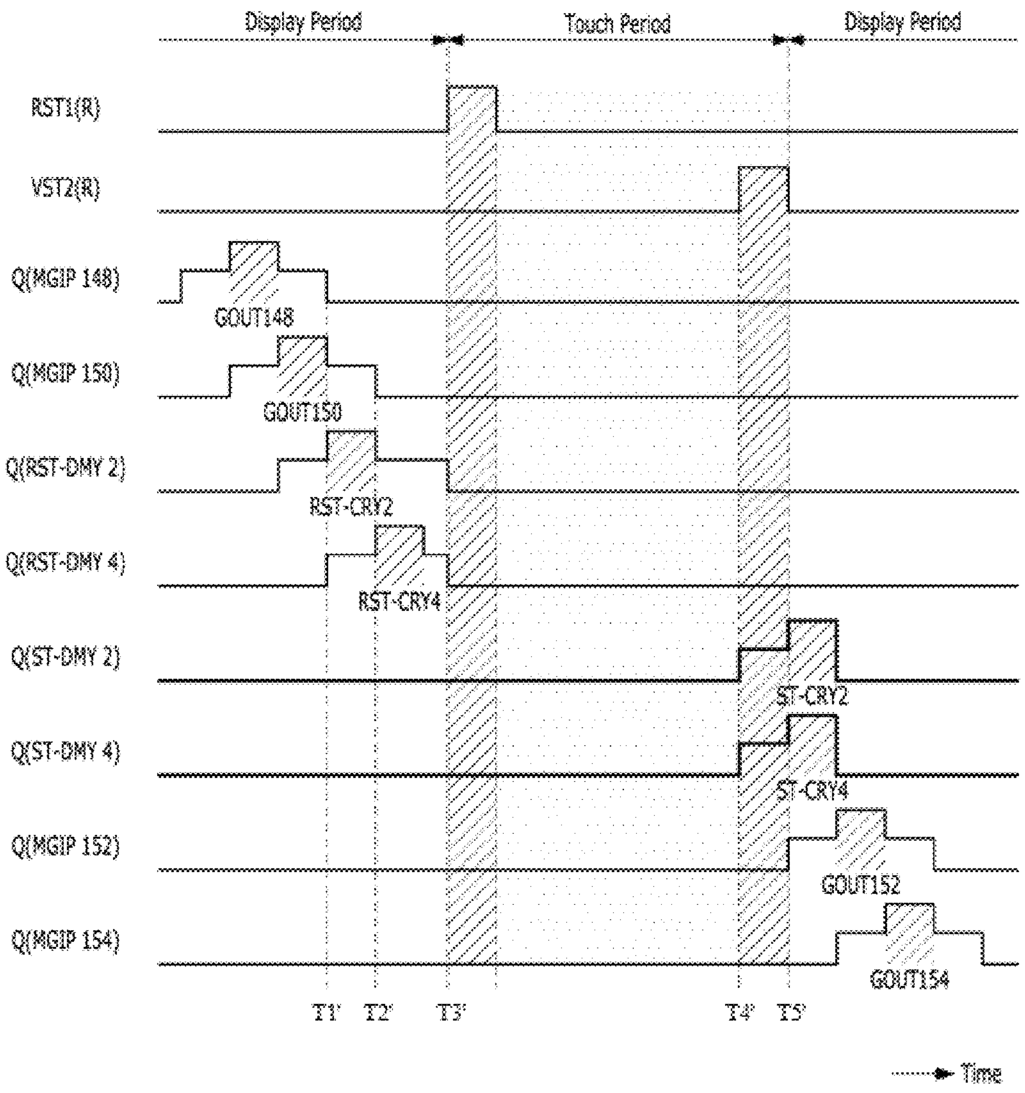
FIG. 10 is a diagram illustrating an operation timing of the second gate driver corresponding to the region AR2 of FIG. 6 according to the present embodiment.

FIG. 9 is a diagram illustrating in detail a configuration of a second gate driver 120B corresponding to a region AR2 of FIG. 6 according to one embodiment. FIG. 10 is a diagram illustrating an operation timing of the second gate driver 120B corresponding to the region AR2 of FIG. 6 according to one embodiment.

Referring to FIGS. 6, 9, and 10, the second gate driver 120B according to the present embodiment may include a plurality of first even main stages RBK1 which drive first even gate lines EL of a first display block LHB1 in a first display period, a plurality of second even main stages RBK2 which drive second even gate lines EL of a second display block LHB2 adjacent to the first display block LHB1 in a second display period, even reset dummy stages RST-DMY2 and RST-DMY4 for resetting Q nodes included in lower-priority operation stages MGIP148 and MGIP150 of the first even main stages RBK1 in the first display period, and even set dummy stages ST-DMY2 and ST-DMY4 for setting Q nodes included in higher-priority operation stages MGIP152 of the second even main stages RBK2 in the second display period.

All of the even reset dummy stages RST-DMY2 and RST-DMY4 and the even set dummy stages ST-DMY2 and ST-DMY4 may not be connected to the first even gate lines EL of the first display block LHB1 and to the second even gate lines EL of the second display block LHB2.

A voltage of a Q node included in a lower-priority operation stage MGIP148 of the first even main stages RBK1 may be reset to a low-level voltage VSS at a first timing T1 of the first display period, based on an output RST-CRY2 of the even reset dummy stage RST-DMY2.

A voltage of a Q node included in a lower-priority operation stage MGIP150 of the first even main stages RBK1 may be reset to the low-level voltage VSS at a second timing T2 of the first display period, based on an output RST-CRY4 of the even reset dummy stage RST-DMY4.

Therefore, during a touch period, all of Q nodes of the first even main stages RBK1 and Q nodes of the second even main stages RBK2 may maintain the reset level having the low-level voltage VSS, and thus, Q node holding stress causing the problem of the related art may be minimized.

A voltage of the Q node included in each of the even reset dummy stages RST-DMY2 and RST-DMY2 may be reset to the low-level voltage VSS at a third timing T3 of the first display period, based on an external even reset signal RST1(R). At this time, the external even reset signal RST1 (R) may be synchronized with a start timing of a touch period.

A voltage of the Q node included in each of the even set dummy stages ST-DMY2 and ST-DMY4 may be reset to a high-level voltage VDD at a fourth timing T4 of the touch period, based on an external even set signal VST2(R). At this time, the external even set signal VST2(R) may be synchronized with an end timing of the touch period.

A voltage of a Q node included in a higher-priority operation stage MGIP152 of the second even main stages RBK2 may be set to the high-level voltage VDD at a fifth timing T5 of the second display period, based on outputs ST-CRY2 and ST-CRY4 of the even set dummy stages ST-DMY2 and ST-DMY4.

In FIG. 10, GOUT 148 represents an output of the operation stage MGIP148, GOUT 150 represents an output of the operation stage MGIP150, GOUT 152 represents an output of the operation stage MGIP152, and GOUT 154 represents an output of the operation stage MGIP154.

Figure 12:
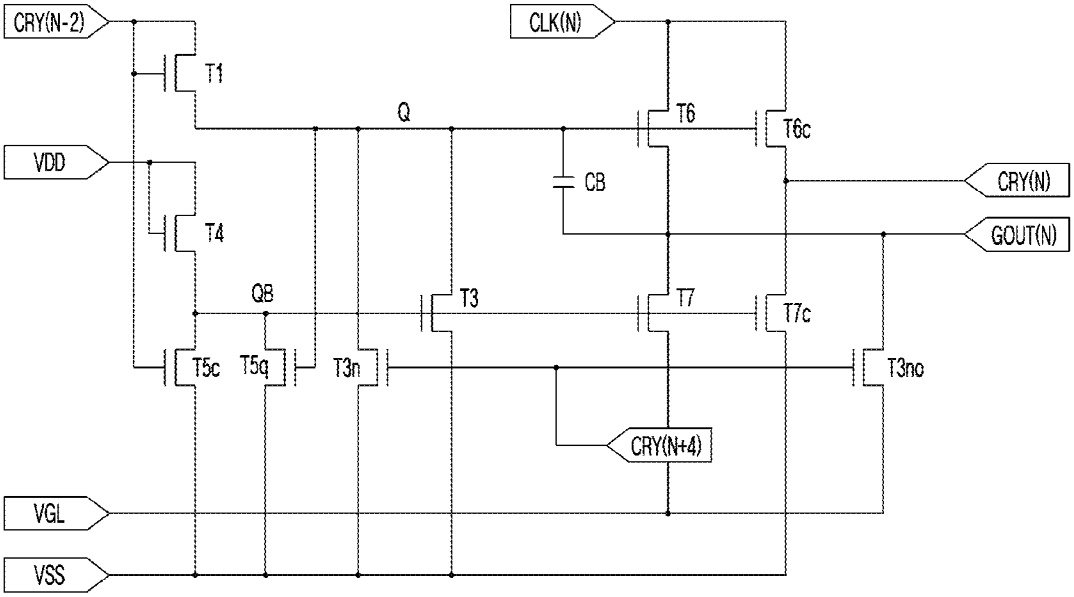
FIG. 12 is a diagram illustrating a configuration of a main stage or a dummy stage included in a gate driving circuit according to the present embodiment.

FIG. 12 is a diagram illustrating a configuration of a main stage (or a dummy stage) included in a gate driving circuit according to the present embodiment. The main stage and the dummy stage described above may be designed to be equal to FIG. 12.

Referring to FIG. 12, a main stage included in a gate driving circuit according to the present embodiment may include a plurality of transistors and at least one capacitor. Each of the transistors is illustrated as a single type where one transistor is provided, and depending on the case, may be configured as a dual type where two or more transistors are connected to each other. Each of the transistors may be implemented with an oxide semiconductor.

The main stage may include a pull-up transistor T6 and a pull-down transistor T7, which control an output of a scan signal synchronized with a current-stage clock signal CLK (N). The main stage may include a pull-up transistor T6*c* and a pull-down transistor T7*c*, which control an output of a current-stage carry signal CRY (N) synchronized with the current-stage clock signal CLK(N).

The main stage may include a capacitor CB connected between a Q node and a scan output node.

The main stage may include a transistor T1 which is turned on based on a previous-stage carry signal CRY (N−2) output from a previous stage and sets a voltage of the Q node.

The main stage may include a transistor T3 which is turned on based on a voltage of a QB node and resets the voltage of the Q node.

The main stage may include a transistor T4 which applies a high-level voltage VDD to the QB node.

The main stage may include a transistor T5*c* which is turned on based on the previous-stage carry signal CRY (N−2) and applies a low-level voltage VSS to the QB node.

The main stage may include a transistor T5*q* which is turned on based on the voltage of the Q node and applies the low-level voltage VSS to the QB node.

The main stage may include a transistor T3*n* which is turned on based on a next-stage carry signal CRY (N+4) output from a next stage and resets the voltage of the Q node.

The main stage may include a transistor T3*no* which is turned on based on the next-stage carry signal CRY (N+4) and applies a low-level voltage VGL to the scan output node.

The present embodiment may realize the following effects.

The present embodiment may minimize Q node holding stress applied to at least some stages when performing time division driving of a display period and a touch period, thereby decreasing an output deviation between stages.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A gate driving circuit comprising:

a plurality of first odd main stages configured to drive first odd gate lines of a first display block during a first display period, the plurality of first odd main stages including a first plurality of first odd main stages and a second plurality of first odd main stages;

a plurality of second odd main stages configured to drive second odd gate lines of a second display block that is arranged after the first display block in a second display period that is after the first display period, the plurality of second odd main stages including a first plurality of second odd main stages and a second plurality of second odd main stages;

an odd reset dummy stage configured to reset a Q node included in each of the second plurality of first odd main stages that operate after the first plurality of first odd main stages to a reset level during the first display period; and an odd set dummy stage configured to set a Q node included in each of the first plurality of second odd main stages that operates before the second plurality of second odd main stages to a set level during the second display period, wherein all of Q nodes of the plurality of first odd main stages and all of the Q nodes of the plurality of second odd main stages maintain the reset level during a touch period that is arranged between the first display period and the second display period.

2. The gate driving circuit of claim 1, wherein the odd reset dummy stage and the odd set dummy stage are not connected to the first odd gate lines and the second odd gate lines.

3. The gate driving circuit of claim 1, wherein a Q node included in the odd reset dummy stage is reset based on an external odd reset signal and a Q node included in the odd set dummy stage is set based on an external odd set signal, and wherein the external odd reset signal is synchronized with a start timing of the touch period and the external odd set signal is synchronized with an end timing of the touch period.

4. The gate driving circuit of claim 1, further comprising:

a plurality of first even main stages configured to drive first even gate lines of the first display block during the first display period, the plurality of first even main stages including a first plurality of first even main stages and a second plurality of first even main stages;

a plurality of second even main stages configured to drive second even gate lines of the second display block during the second display period, the plurality of second even main stages including a first plurality of second even main stages and a second plurality of second even main stages;

an even reset dummy stage configured to reset a Q node included in each of the second plurality of first even main stages that operate after the first plurality of first even main stages to the reset level during the first display period; and an even set dummy stage configured to set a Q node included in each of the first plurality of second even main stages that operates before the second plurality of second even main stages to the set level during the second display period, wherein all of Q nodes of the plurality of first even main stages and all of Q nodes of the plurality of second even main stages maintain the reset level during the touch period that is arranged between the first display period and the second display period.

5. The gate driving circuit of claim 4, wherein the even reset dummy stage and the even set dummy stage are not connected to the first even gate lines and the second even gate lines.

6. The gate driving circuit of claim 4, wherein a Q node included in the even reset dummy stage is reset based on an external even reset signal and a Q node included in the even set dummy stage is set based on an external even set signal, and wherein the external even reset signal is synchronized with a start timing of the touch period and the external even set signal is synchronized with an end timing of the touch period.

7. A touch sensing display device comprising:

a display panel divided into a first display block and a second display block that is arranged after the first display block in the display panel, the first display block including first odd subpixels that are connected to first odd gate lines included in the display panel and first even subpixels that are connected to first even gate lines included in the display panel, and the second display block including second odd subpixels that are connected to second odd gate lines included in the display panel and second even subpixels that are connected to second even gate lines included in the display panel; and a gate driving circuit configured to drive the first odd gate lines and the first even gate lines of the first display block and the second odd gate lines and the second even gate lines of the second display block, wherein the gate driving circuit comprises:

a plurality of first odd main stages configured to drive the first odd gate lines of the first display block during a first display period, the plurality of first odd main stages including a first plurality of first odd main stages and a second plurality of first odd main stages;

a plurality of second odd main stages configured to drive the second odd gate lines of the second display block during a second display period, the plurality of second odd main stages including a first plurality of second odd main stages and a second plurality of second odd main stages;

an odd reset dummy stage configured to reset a Q node included in each of the second plurality of first odd main stages that operate after the first plurality of first odd main stages to a reset level during the first display period; and an odd set dummy stage configured to set a Q node included in each of the first plurality of second odd main stages that operates before the second plurality of second odd main stages to a set level during the second display period, wherein all of Q nodes of the plurality of first odd main stages and all of the Q nodes of the plurality of second odd main stages maintain the reset level during a touch period during which touch of the display panel is sensed, the touch period arranged between the first display period and the second display period.

8. The touch sensing display device of claim 7, wherein the odd reset dummy stage and the odd set dummy stage are not connected to the first odd gate lines and the second odd gate lines.

9. The touch sensing display device of claim 7, wherein a Q node included in the odd reset dummy stage is reset based on an external odd reset signal and a Q node included in the odd set dummy stage is set based on an external odd set signal, and wherein the external odd reset signal is synchronized with a start timing of the touch period and the external odd set signal is synchronized with an end timing of the touch period.

10. The touch sensing display device of claim 7, wherein the gate driving circuit further comprises:

a plurality of first even main stages configured to drive first even gate lines of the first display block during the first display period, the plurality of first even main stages including a first plurality of first even main stages and a second plurality of first even main stages;

a plurality of second even main stages configured to drive second even gate lines of the second display block during the second display period, the plurality of second even main stages including a first plurality of second even main stages and a second plurality of second even main stages;

an even reset dummy stage configured to reset a Q node included in each of the second plurality of first even main stages that operate after the first plurality of first even main stages to the reset level during the first display period; and an even set dummy stage configured to set a Q node included in each of the first plurality of second even main stages that operates before the second plurality of second even main stages to the set level during the second display period, wherein all of Q nodes of the plurality of first even main stages and all of Q nodes of the plurality of second even main stages maintain the reset level during the touch period arranged between the first display period and the second display period.

11. The touch sensing display device of claim 10, wherein the even reset dummy stage and the even set dummy stage are not connected to the first even gate lines and the second even gate lines.

12. The touch sensing display device of claim 10, wherein a Q node included in the even reset dummy stage is reset based on an external even reset signal and a Q node included in the even set dummy stage is set based on an external even set signal, and wherein the external even reset signal is synchronized with a start timing of the touch period and the external even set signal is synchronized with an end timing of the touch period.

13. A touch display device comprising:

a display panel divided into a plurality of display blocks including a first display block, the first display block including first subpixels that are connected to first gate lines included in the display panel and second subpixels that are connected to second gate lines included in the display panel; and a gate driving circuit configured to drive the first gate lines and the second gate lines of the first display block, the gate driving circuit comprising:

a plurality of first main stages configured to drive the first gate lines but not the second gate lines during a first display period during which an image is displayed on the display panel, the plurality of first main stages including a first plurality of first main stages and a second plurality of first main stages; and a first reset dummy stage configured to reset a Q node included in each of the second plurality of first main stages that operate after the first plurality of first main stages to a reset level during the first display period without resetting a Q node included in each of the first plurality of first main stages during the first display period, wherein all of Q nodes of the first plurality of first main stages and all of the Q nodes of the second plurality of first main stages included in the plurality of first main stages have the reset level during a touch period during which touch of the display panel is sensed, the touch period after the first display period.

14. The touch display device of claim 13, wherein the display panel further comprises a second display block that is arranged after the first display block in the display panel, the second display block including third subpixels that are connected to third gate lines included in the display panel and fourth subpixels that are connected to fourth gate lines included in the display panel, and the gate driving circuit further comprising:

a plurality of second main stages configured to drive the third gate lines of the second display block but not the fourth gate lines during a second display period that is after the first display period, the plurality of second main stages including a first plurality of second main stages and a second plurality of second main stages; and a first set dummy stage configured to set a Q node included in each of the first plurality of second main stages that operates before the second plurality of second main stages to a set voltage that is greater than the reset level during the second display period.

15. The touch display device of claim 14, wherein the first reset dummy stage and the first set dummy stage are not connected to the first gate lines and the third gate lines.

16. The touch display device of claim 14, wherein a Q node included in the first reset dummy stage is reset based on an external reset signal and a Q node included in the first set dummy stage is set based on an external set signal, and wherein the external reset signal is synchronized with a start timing of the touch period and the external set signal is synchronized with an end timing of the touch period.

17. The touch display device of claim 14, wherein the gate driving circuit further comprises:

a plurality of third main stages configured to drive the second gate lines of the first display block but not the first gate lines during the first display period, the plurality of third main stages including a first plurality of third main stages and a second plurality of third main stages;

a plurality of fourth main stages configured to drive the fourth gate lines of the second display block but not the third gate lines of the second display block during the second display period, the plurality of fourth main stages including a first plurality of fourth main stages and a second plurality of fourth main stages;

a second reset dummy stage configured to reset a Q node included in each of the second plurality of third main stages that operate after the first plurality of third main stages during the first display period without resetting a Q node included in each of the first plurality of third main stages during the first display period; and a second set dummy stage configured to set a Q node included in each of the first plurality of fourth main stages that operates before the second plurality of fourth main stages during the second display period, wherein all of Q nodes of the plurality of third main stages and all of Q nodes of the plurality of fourth main stages maintain the reset level during the touch period that is arranged between the first display period and the second display period.

18. The touch display device of claim 17, wherein the second reset dummy stage and the second set dummy stage are not connected to the second gate lines and the fourth gate lines.

19. The touch display device of claim 18, wherein a Q node included in the second reset dummy stage is reset based on an external even reset signal and a Q node included in the second set dummy stage is set based on an external even set signal, and wherein the external even reset signal is synchronized with a start timing of the touch period and the external even set signal is synchronized with an end timing of the touch period.

20. The touch display device of claim 17, wherein the first gate lines are first odd gate lines included in the first display block and the second gate lines are first even gate lines included in the first display block, and the third gate lines are second odd gate lines included in the second display block and the fourth gate lines are second even gate lines included in the second display block.

21. The touch display device of claim 20, wherein the plurality of first main stages, the first reset dummy stage, the plurality of second main stages, and the first set dummy stage are at a first side of the display panel, wherein the plurality of third main stages, the plurality of fourth main stages, the second reset dummy stage, and the second set dummy stage are at a second side of the display panel that is opposite the first side of the display panel.

* * * * *